No. 788,231. PATENTED APR. 25, 1905.
F. ACKER.
PERCOLATOR FOR COFFEE, &c.
APPLICATION FILED JULY 28, 1904.

Witnesses
P. F. Nagle
L. J. Conville

Inventor
Finley Acker
By Dieterich & Fairbank
Attorneys

No. 788,231. Patented April 25, 1905.

UNITED STATES PATENT OFFICE.

FINLEY ACKER, OF PHILADELPHIA, PENNSYLVANIA.

PERCOLATOR FOR COFFEE, &c.

SPECIFICATION forming part of Letters Patent No. 788,231, dated April 25, 1905.

Application filed July 28, 1904. Serial No. 218,483.

*To all whom it may concern:*

Be it known that I, FINLEY ACKER, a citizen of the United States, residing in the city and county of Philadelphia, State of Pennsylvania, have invented a new and useful Improvement in Percolators for Coffee, &c., of which the following is a specification.

Percolators have been made with perforated bottoms; but the objection to the same is that the very fine particles of coffee sink to the bottom and form a pasty coating over the perforations and materially delay or hamper the passage of the decoction into the receptacle below.

The object of my invention is to remedy the above; and to this effect it consists in forming the perforations in the side of the cylinder or body of the percolator and in providing an imperforate bottom therefor, said bottom being of dome or cone shape or otherwise upwardly deflected.

Figure 1:
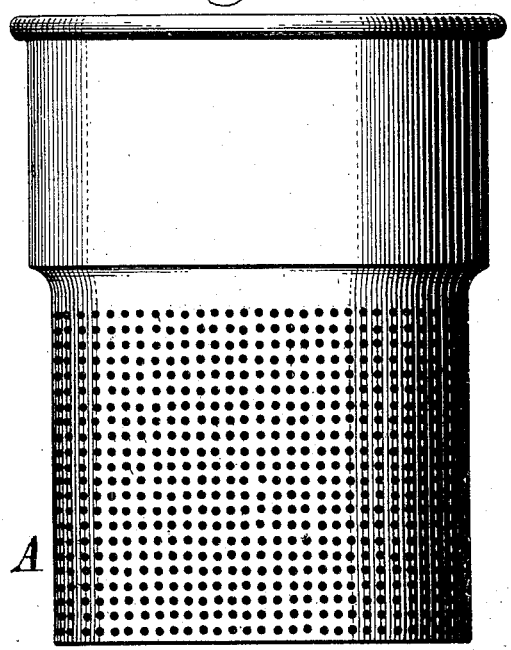
Figure 2:
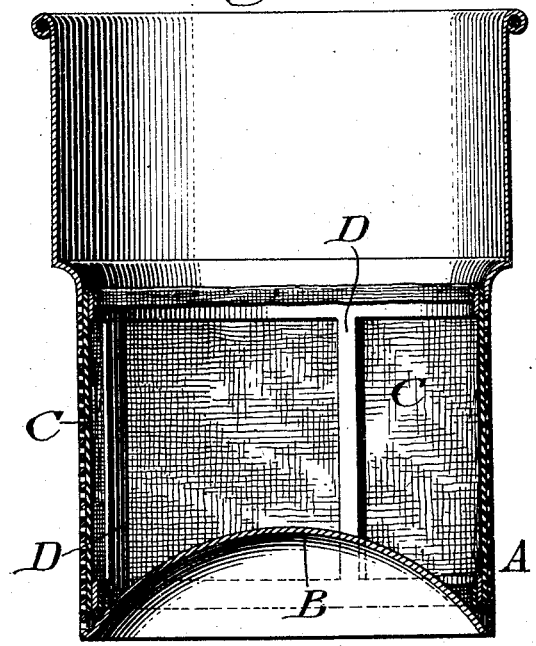
Figure 4:
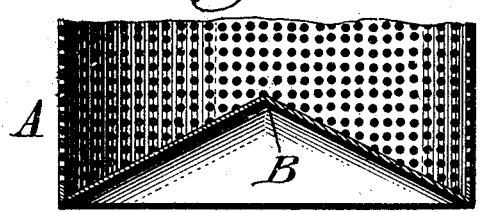
Figure 3:
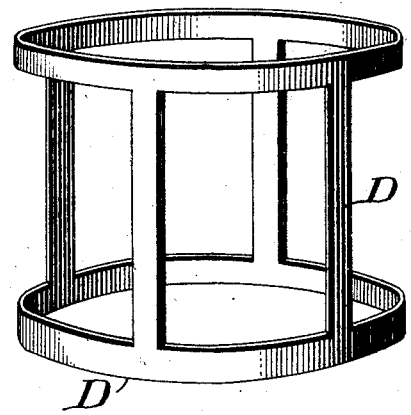
Figure 6:
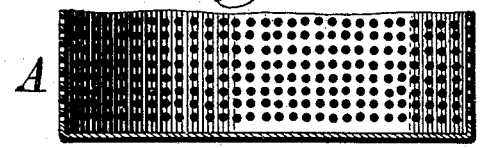
Figure 5:
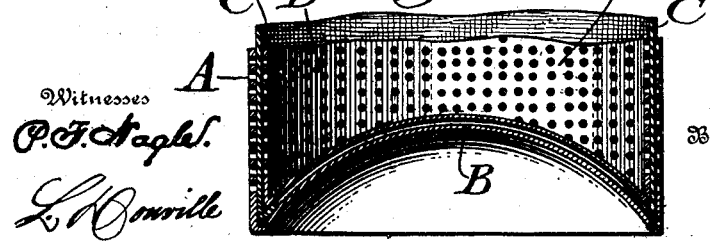

Figure 1 represents a side elevation of a percolator embodying my invention. Fig. 2 represents a vertical section thereof. Fig. 3 represents a perspective view of a detached portion thereof. Figs. 4, 5, and 6 represent vertical sections of portions of modifications.

Similar letters of reference indicate corresponding parts in the figures.

Referring to the drawings, A designates the casing of a percolator, the same being preferably formed of metal, of cylindrical or other desired shape, the lower portion of the side or side wall of which is foraminous or perforated and the upper portion of which is imperforated, and the bottom B, of which is deflected upwardly in the form of a dome, as in Figs. 2 and 5, or of a cone, as in Fig. 4. On the inner side of the body is a lining of filtering material C, preferably of porous or bibulous paper, which permits the passage of fluid therethrough, while retaining or trapping the solid matters in the body, it being evident that the fluid flows from the lower portion of the casing through said filtering material and the perforations of the former, and so reaches the vessel within which the casing is suspended. In order to sustain the filtering material, I employ the frame D, which consists of suitable upright pieces and horizontal rings, of metal or other material, properly connected and forming a light and open structure to which the filtering material is secured, the upper and lower ends of said material being connected with said rings, whereby said material is retained in operative position and may be removed with the frame and restored when so required. When the filter is in position, it rests upon the peripheral portion of the bottom and may be pressed down firmly thereagainst, owing to the stiffening nature of the rigid frame D, thus forming a tight joint, which prevents the escape of the unfiltered fluid coffee under the filter.

In Fig. 5 I show a perforated casing D', somewhat similar to the cylinder A, in lieu of the frame D for sustaining the filter C without producing any different results, excepting that said casing D' has a closed bottom which is deflected upwardly and covers the upwardly-deflected bottom B of the casing A, thus firmly sustaining the filter in the latter.

In Fig. 6 the imperforate bottom of the casing A is flat; but the filter and the support thereof will be sustained in said casing on the peripheral portion of said bottom, the filter contacting with the inner side of the perforated wall of said casing, as shown in the other figures.

In actual operation the pulverized or finely-ground coffee is placed in the percolator and the hot water is quickly poured direct upon the coffee. The dome or cone shape of the bottom forces the ground coffee against the perforated sides of the percolator, while most of the very fine ground or "pasty" portion of the coffee sinks to the bottom, leaving the perforations unclogged and unhampered and permitting the decoction to pass through in about one-fourth the time required in a percolator where the perforations are at the bottom. This quicker method of making the decoction thereby not only saves the difference in time, but also imparts a fresher flavor to the decoction than is the case where the longer time is required, while at the same time the throwing of the coffee against the sides of the cylinder caused by the dome-shaped base and which requires the water to penetrate and pass through the ground coffee causes the extraction of full flavor.

The cylinder A, although practicable, does not make a perfectly clear liquid, inasmuch as some of the extremely fine particles of coffee may pass through the minute perforations thereof; but the material C makes the liquid absolutely clear and highly advantageous.

Having thus described my invention, what I claim as new, and desire to secure by Letters Patent, is—

1. In a percolator, a casing having a foraminous side wall and an upwardly-deflected imperforate bottom and a filter contacting with the interior of said wall, said filter having an open frame consisting of upright pieces and horizontal rings at the top and bottom thereof, the filtering material being connected with said rings and said frame supporting said filter on the peripheral portion of said imperforate bottom.

2. In a percolator, a casing having a perforated side wall, an imperforate bottom, a filter contacting with the interior of said perforated side wall and means for removably supporting said filter on the peripheral portion of said imperforate bottom.

3. In a percolator, a casing having a foraminous side wall, an upwardly-deflected imperforate bottom and a filter contacting with the interior of said foraminous wall and resting on the peripheral portion of said bottom.

4. In a percolator, a casing having a closed bottom, a foraminous side wall, a filter lining the interior of said wall and a support for said lining sustaining said filter on the peripheral portion of the bottom.

5. In a percolator, a casing having the lower portion of its side wall, foraminous, the side wall of its upper portion, imperforate, an upwardly-deflected imperforate bottom and a removable filter lining the interior of the foraminous wall, said filter having an open frame to which the filtering material is secured and which sustains said filter on the peripheral portion of said imperforate bottom.

FINLEY ACKER.

Witnesses:
N. LINCOLN ACKER,
J. D. ACKER.